United States Patent
Li et al.

(10) Patent No.: US 10,263,697 B2
(45) Date of Patent: Apr. 16, 2019

(54) METHOD AND APPARATUS FOR MONITORING CHROMATIC DISPERSION IN OPTICAL COMMUNICATIONS NETWORK

(71) Applicant: Huawei Technologies Co., Ltd., Shenzhen, Guangdong (CN)

(72) Inventors: Zhaohui Li, Guangzhou (CN); Yuli Chen, Guangzhou (CN); Dawei Wang, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/967,267

(22) Filed: Apr. 30, 2018

(65) Prior Publication Data
US 2018/0248618 A1    Aug. 30, 2018

Related U.S. Application Data (63) Continuation of application No. PCT/CN2016/086577, filed on Jun. 21, 2016.

(30) Foreign Application Priority Data

Oct. 31, 2015   (CN) .......................... 2015 1 0731949

(51) Int. Cl.
*H04B 10/61*    (2013.01)
*H04B 10/077*   (2013.01)
(Continued)

(52) U.S. Cl.
CPC ... *H04B 10/07951* (2013.01); *H04B 10/0775* (2013.01); *H04B 10/2513* (2013.01); *H04B 10/6161* (2013.01)

(58) Field of Classification Search
CPC .......... H04B 10/07951; H04B 10/6161; H04B 10/0775; H04B 10/2513
See application file for complete search history.

(56) References Cited

U.S. PATENT DOCUMENTS

2009/0127443 A1   5/2009  Liu et al.
2011/0188860 A1   8/2011  Li et al.
(Continued)

FOREIGN PATENT DOCUMENTS

CN       1968055 A       5/2007
CN     101286804 A      10/2008
(Continued)

OTHER PUBLICATIONS

Seb J. Savory et al., "Electronic compensation of chromatic dispersion using a digital coherent receiver", Optics Express, Mar. 5, 2007, vol. 15, No. 5, 7 pages.

*Primary Examiner* — Casey L Kretzer (57) ABSTRACT

The present disclosure discloses a method and an apparatus for monitoring chromatic dispersion in an optical communications network. The method includes: performing coherent mixing of a to-be-monitored signal with a first optical signal and a second optical signal to obtain two analog electrical signals, where center frequencies of the first optical signal and the second optical signal are located on two sides of a center frequency of the to-be-monitored signal, and a difference between the center frequencies of these two optical signals equals a Baud rate; converting the two analog electrical signals into two corresponding first time domain power signals; determining a value of a time delay between these two time domain power signals; and obtaining, according to a correspondence between the value of the time delay and the chromatic dispersion, the fiber chromatic dispersion generated in a process of transmitting the to-be-monitored signal.

10 Claims, 8 Drawing Sheets

(51) Int. Cl.
    *H04B 10/079*     (2013.01)
    *H04B 10/2513*     (2013.01)

(56) References Cited

U.S. PATENT DOCUMENTS

| | | |
|---|---|---|
| 2012/0099864 A1 | 4/2012 | Ishihara et al. |
| 2013/0004158 A1* | 1/2013 | Goldfarb .............. H04B 10/612 398/25 |
| 2013/0034352 A1 | 2/2013 | Liu |
| 2014/0105616 A1 | 4/2014 | Yan et al. |
| 2014/0341564 A1 | 11/2014 | Westlund et al. |
| 2015/0304025 A1 | 10/2015 | Liu et al. |
| 2016/0164599 A1* | 6/2016 | Heismann ........ H04B 10/07953 398/26 |
| 2016/0269108 A1 | 9/2016 | Yao et al. |

FOREIGN PATENT DOCUMENTS

| | | |
|---|---|---|
| CN | 101662326 A | 3/2010 |
| CN | 102326344 A | 1/2012 |
| CN | 103281129 A | 9/2013 |
| CN | 103713194 A | 4/2014 |
| CN | 104168068 A | 11/2014 |
| CN | 104348544 A | 2/2015 |
| CN | 104579476 A | 4/2015 |
| WO | 2010061247 A1 | 6/2010 |

\* cited by examiner

METHOD AND APPARATUS FOR MONITORING CHROMATIC DISPERSION IN OPTICAL COMMUNICATIONS NETWORK

CROSS-REFERENCE TO RELATED APPLICATIONS

This application is a continuation of International Patent Application No. PCT/CN2016/086577, filed on Jun. 21, 2016, which claims priority to Chinese Patent Application No. 201510731949.3, filed on Oct. 31, 2015. The disclosures of the aforementioned applications are hereby incorporated by reference in their entireties.

TECHNICAL FIELD

The present application relates to the field of communications technologies, and in particular, to a method and an apparatus for monitoring chromatic dispersion in an optical communications network.

BACKGROUND

With increasing data service requirements, a high-speed fiber optic transmission network with a large capacity gradually becomes a main direction of information transmission. Continuous innovation of new fiber optic communications technologies also contributes to a fiber optic transmission distance multiplied year by year. An optical parameter becomes an important indicator for measuring a fiber optic communications system. To better manage and monitor an optical network, it is necessary to monitor an important transmission parameter of the network, and Optical Performance Monitoring (OPM) gains more attention as fiber optic communications develops. In many parameters, Chromatic Dispersion (CD) is an important parameter that can reflect an operating status of the optical network.

Figure 1:
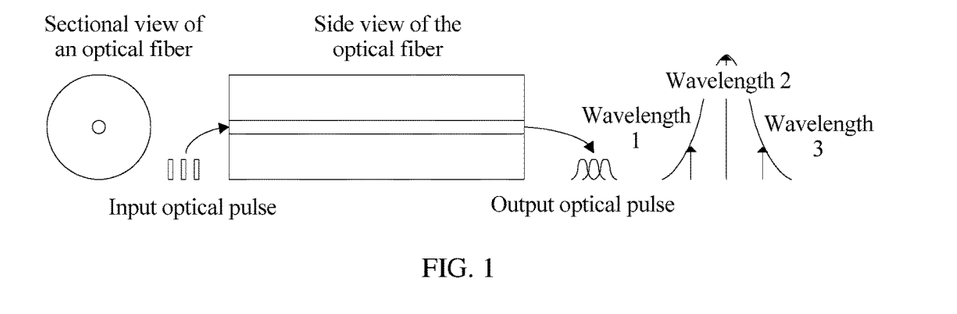
FIG. 1 is a schematic diagram of an optical signal transmitted in an optical fiber in the prior art.

In the fiber optic communications system, optical chromatic dispersion is an important indicator for measuring quality of a fiber link, and is greatly significant to system estimation and measurement. Optical chromatic dispersion indicates a difference between transmission rates of lightwave frequency components. As shown in FIG. 1, an optical signal is carried by different frequency components in an optical fiber, and these different frequency components have different propagation speeds when passing a same medium. This phenomenon is called chromatic dispersion. In terms of time, when an optical pulse propagates through an optical fiber, a waveform of the optical pulse is broadened in time, and therefore causes signal distortion. Consequently, a receive error is caused, and a transmission capacity of the optical fiber is limited. Chromatic dispersion and a fiber length are in a linear relationship, that is, a longer optical fiber indicates stronger chromatic dispersion. A length of an optical fiber through which an optical signal passes can be determined by monitoring CD on an intermediate transmission node in the fiber optic communications system. Alternatively, with a length of an optical fiber known, a chromatic dispersion parameter of the optical fiber can be determined. These monitoring results can provide an important determining basis for evaluating communication quality of the optical network.

Figure 2:
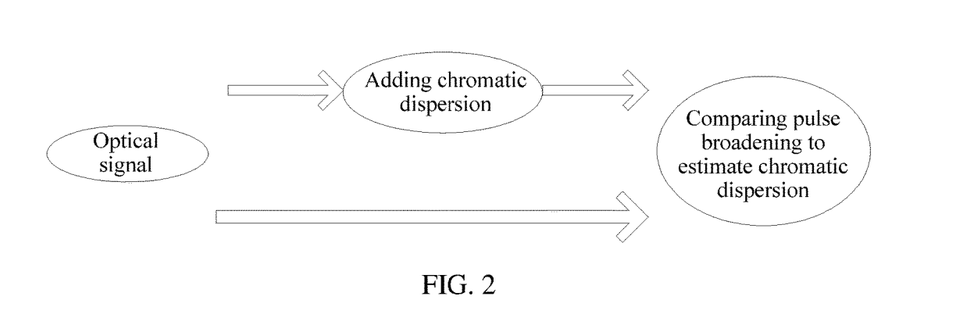
FIG. 2 is a schematic flowchart of a pulse delay method for measuring chromatic dispersion in the prior art.

In the prior art, a method for measuring chromatic dispersion may be a pulse delay method, and a specific implementation of the method may be (the implementation of the method is shown in FIG. 2):

A pulse signal generator is used to modulate a laser, and an optical signal output from the laser is divided into two signals by using a spectroscope. One signal enters a monitored optical fiber (this optical pulse signal is broadened due to a chromatic dispersion effect). The other signal directly enters an optical monitor and a receiver without passing through the monitored optical fiber. The two received signals are sent to a dual-trace oscilloscope. Widths of the two optical pulses are obtained by respectively measuring displayed pulse waveforms. It is assumed that waveforms of both an optical pulse input into an optical fiber and that output from the optical fiber are approximately Gaussian, and chromatic dispersion of the optical fiber can be calculated by measuring, by using a time domain method, pulse broadening caused by fiber optic transmission.

The pulse delay method is a method in which a fiber chromatic dispersion coefficient is directly obtained from a defined formula by measuring a time delay difference between narrow optical pulses with different wavelengths after the narrow optical pulses are transmitted through an optical fiber. In this method, a narrow optical pulse with a known shape (a width is generally several hundred ps) is injected into a to-be-monitored optical fiber. The optical pulse is broadened due to chromatic dispersion of the optical fiber after being transmitted along the optical fiber. A waveform of this broadened optical pulse is recorded at an output end of the optical fiber. Pulse broadening caused by the chromatic dispersion can be obtained from a difference between a width of an output pulse and a width of an input pulse, and therefore the chromatic dispersion caused by the optical fiber can be obtained by means of estimation according to the broadening.

It can be learned from the implementation of the foregoing pulse delay method that, a comparison between original pulses is required to estimate chromatic dispersion by using this method, and this is difficult to implement in actual long-distance transmission application.

SUMMARY

The present disclosure provides a method and an apparatus for monitoring chromatic dispersion in an optical communications network, and the method and apparatus provided in the present disclosure resolve a problem that an existing pulse delay method is difficult to implement in long-distance transmission application.

According to a first aspect, a method for monitoring chromatic dispersion in an optical communications network is provided. The method includes:

performing coherent mixing of a to-be-monitored signal with a first optical signal to obtain a first analog electrical signal;

performing coherent mixing of the to-be-monitored signal with a second optical signal to obtain a second analog electrical signal, where center frequencies of the first optical signal and the second optical signal are located on two sides of a center frequency of the to-be-monitored signal, and a difference between the center frequencies of the first optical signal and the second optical signal equals a Baud rate;

converting the first analog electrical signal into a corresponding first time domain power signal, and converting the second analog electrical signal into a second time domain power signal;

determining a value of a time delay between the first time domain power signal and the second time domain power signal; and obtaining, according to a correspondence between the value of the time delay and the chromatic dispersion, the fiber chromatic dispersion generated in a process of transmitting the to-be-monitored signal.

With reference to the first aspect, in a first possible implementation, the obtaining, according to a correspondence between the value of the time delay and the chromatic dispersion, the fiber chromatic dispersion generated in a process of transmitting the to-be-monitored signal includes:

determining, according to the value of the time delay and a formula $$CD = \frac{\tau_0 Tc}{\lambda^{\wedge}2},$$

the fiber chromatic dispersion generated in the process of transmitting the to-be-monitored signal, where $\tau_0$ is the value of the time delay between the two time domain power signals, T is an element width of an equivalent baseband signal of the to-be-monitored signal, $\lambda$ is the center frequency of the to-be-monitored signal, and c is the speed of light.

With reference to the first aspect or the first possible implementation of the first aspect, in a second possible implementation, the converting the first analog electrical signal into a corresponding first time domain power signal, and converting the second analog electrical signal into a second time domain power signal includes:

performing analog-to-digital conversion processing on the first analog electrical signal to obtain a first digital signal, and performing analog-to-digital conversion processing on the second analog electrical signal to obtain a second digital signal; and performing modular squaring on a value of each moment of the first digital signal to obtain the first time domain power signal, and performing modular squaring on a value of each moment of the second digital signal to obtain the second time domain power signal.

With reference to the second possible implementation of the first aspect, in a third possible implementation, if an optical signal is a signal that includes an X-polarization signal and a Y-polarization signal, and the X-polarization signal and the Y-polarization signal are orthogonal, the method includes:

using the X-polarization signal and the Y-polarization signal separately as the to-be-monitored signal and performing coherent mixing of the to-be-monitored signal separately with the first optical signal and the second optical signal, to obtain an X-polarization analog electrical signal Ux corresponding to the first optical signal, a Y-polarization analog electrical signal Uy corresponding to the first optical signal, an X-polarization analog electrical signal Lx corresponding to the second optical signal, and a Y-polarization analog electrical signal Ly corresponding to the second optical signal, where Ux and Lx are signals obtained by performing coherent mixing of the X-polarization signal separately with the first optical signal and the second optical signal, and Uy and Ly are signals obtained by performing coherent mixing of the Y-polarization signal separately with the first optical signal and the second optical signal, and the first analog electrical signal includes Ux and Uy, and the second analog electrical signal includes Lx and Ly.

According to a second aspect, an apparatus for monitoring chromatic dispersion in an optical communications network is provided. The apparatus includes:

an optical signal source, configured to generate a first optical signal and a second optical signal, where center frequencies of the first optical signal and the second optical signal are located on two sides of a center frequency of a to-be-monitored signal, and a difference between the center frequencies of the first optical signal and the second optical signal equals a Baud rate;

a first coherent receiver, where the first coherent receiver is connected to the optical signal source, and configured to perform coherent mixing of the to-be-monitored signal with the first optical signal to obtain a first analog electrical signal;

a second coherent receiver, where the second coherent receiver is connected to the optical signal source, and configured to perform coherent mixing of the to-be-monitored signal with the second optical signal to obtain a second analog electrical signal; and a signal processor, where the signal processor is connected to the first coherent receiver and the second coherent receiver, and configured to convert the first analog electrical signal into a corresponding first time domain power signal, convert the second analog electrical signal into a second time domain power signal, determine a value of a time delay between the first time domain power signal and the second time domain power signal, and obtain, according to a correspondence between the value of the time delay and the chromatic dispersion, the fiber chromatic dispersion generated in a process of transmitting the to-be-monitored signal.

With reference to the second aspect, in a first possible implementation, the optical signal source includes:

a first laser, configured to generate the first optical signal; and a second laser, configured to generate the second optical signal.

With reference to the second aspect, in a second possible implementation, the optical signal source includes:

a laser source, configured to generate an optical signal; and an optoelectronic modulator and a microwave signal source, where two input ends of the optoelectronic modulator are respectively connected to an output end of the laser source and that of the microwave signal source, and the optoelectronic modulator is configured to perform, by using a signal generated by the microwave signal source, carrier suppression modulation on the optical signal to generate the first optical signal and the second optical signal.

According to a third aspect, an apparatus for monitoring chromatic dispersion in an optical communications network is provided. The apparatus includes:

a coherent receiving module, configured to perform coherent mixing of a to-be-monitored signal with a first optical signal to obtain a first analog electrical signal, and perform coherent mixing of the to-be-monitored signal with a second optical signal to obtain a second analog electrical signal, where center frequencies of the first optical signal and the second optical signal are located on two sides of a center frequency of the to-be-monitored signal, and a difference between the center frequencies of the first optical signal and the second optical signal equals a Baud rate;

a conversion module, configured to convert the first analog electrical signal into a corresponding first time domain power signal, and convert the second analog electrical signal into a second time domain power signal;

a time delay value determining module, configured to determine a value of a time delay between the first time domain power signal and the second time domain power signal; and a chromatic dispersion determining module, configured to obtain, according to a correspondence between the value of the time delay and the chromatic dispersion, the fiber chromatic dispersion generated in a process of transmitting the to-be-monitored signal.

With reference to the third aspect, in a first possible implementation, the chromatic dispersion determining module is specifically configured to determine, according to the value of the time delay and a formula $$CD = \frac{\tau_0 Tc}{\lambda^{\wedge}2},$$

the fiber chromatic dispersion generated in the process of transmitting the to-be-monitored signal, where $\tau_0$ is the value of the time delay between the two time domain power signals, T is an element width of an equivalent baseband signal of the to-be-monitored signal, $\lambda$ is the center frequency of the to-be-monitored signal, and c is the speed of light.

With reference to the third aspect or the first possible implementation of the third aspect, in a second possible implementation, the conversion determining module is specifically configured to perform analog-to-digital conversion processing on the first analog electrical signal to obtain a first digital signal; perform analog-to-digital conversion processing on the second analog electrical signal to obtain a second digital signal; perform modular squaring on a value of each moment of the first digital signal to obtain the first time domain power signal; and perform modular squaring on a value of each moment of the second digital signal to obtain the second time domain power signal.

One or more of the foregoing technical solutions have at least the following technical effects:

According to the chromatic dispersion detection method and apparatus provided in embodiments of the present disclosure, the two analog electrical signals on upper and lower sidebands of the to-be-monitored optical signal are obtained by performing coherent mixing of the to-be-monitored signal with a specific optical signal, and then the chromatic dispersion is determined by using the value of the time delay between the two analog electrical signals. Therefore, the technical solutions provided in the embodiments are independent of a modulation pattern, and are related to a Baud rate. Therefore an algorithm is simple and is easy to implement.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

For ease of understanding a method provided in the embodiments of the present disclosure, the following describes an implementation principle of the method provided in the embodiments of the present disclosure with reference to the accompanying drawings, specifically including:

A time domain form of an optical signal transmitted from a transmitter may be represented as:

Es(t)={[$\Sigma_n s_n \delta(t-nT)$]*p(t)}c(t) ($S_n$ is signal bit data, $\delta(t)$ is a pulse function, p(t) is a pulse waveform, c(t) is an optical carrier, and * represents a convolution operation), and T is a symbol cycle of the signal. The following are defined:

$$m_1(t) = \Sigma_n s_n \delta(t-nT)$$

$$m_2(t) = p(t)$$

$$m_3(t) = c(t)$$

Figure 3A:
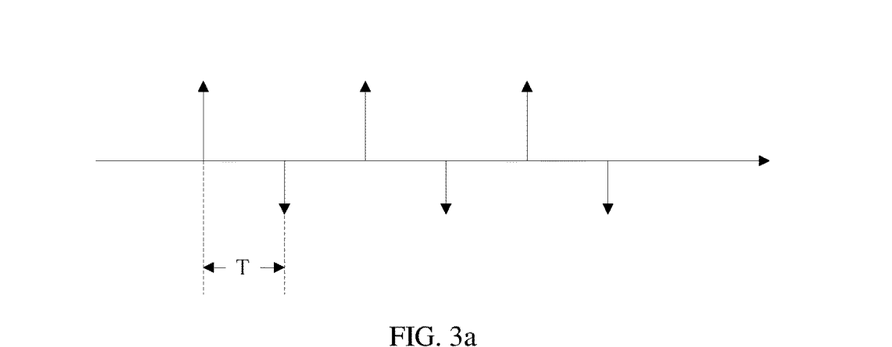
FIG. 3*a* and FIG. 3*b* are schematic diagrams of a transmit signal m1 (*t*) in the prior art.
Figure 3B:
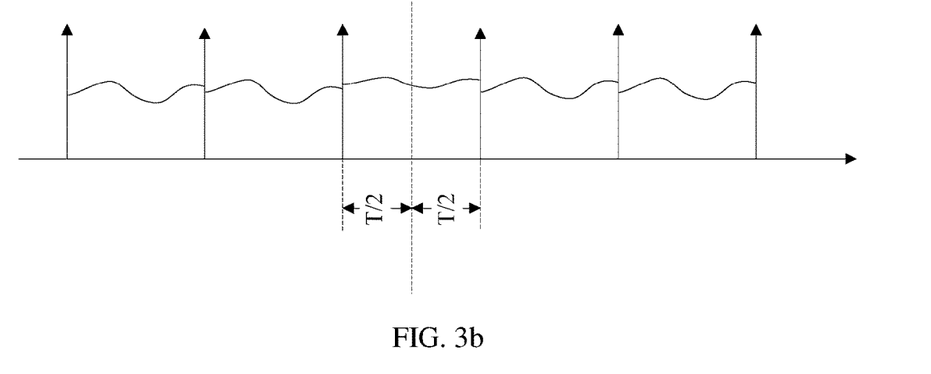
Figure 4A:
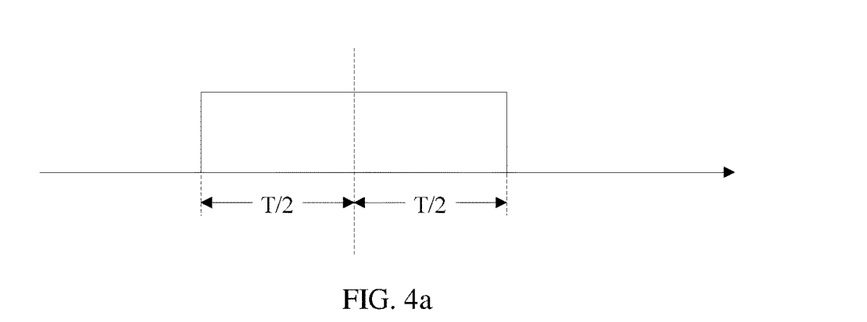
FIG. 4*a* and FIG. 4*b* are schematic diagrams of a signal m2 (*t*) in the prior art.
Figure 4B:
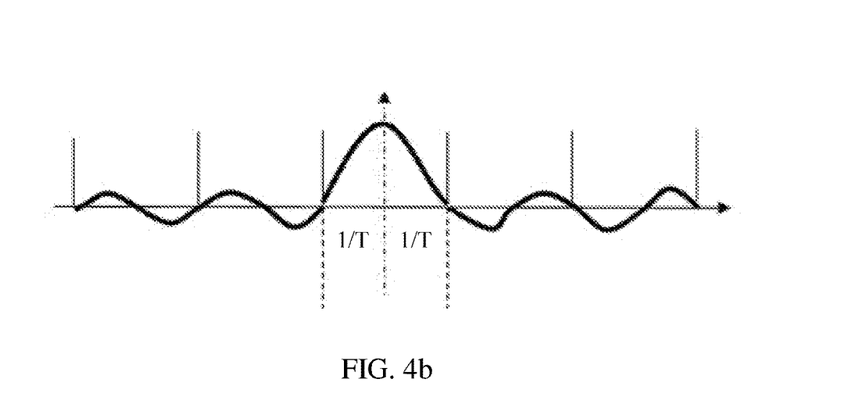

$m_1(t)$ is a baseband form of a transmit signal, and is represented as a pulse function with a cycle of T (as shown in FIG. 3*a*). A frequency domain form of $m_1(t)$ is shown in FIG. 3*b*. $m_1(f)$ is a cyclic signal with a cycle of 1/T.

p(t) is a pulse waveform. If p(t) is a non-return to zero rectangular wave, $m_2(t)$ is shown in FIG. 4*a*. A frequency domain form $m_2(f)$ corresponding to $m_2(t)$ is shown in FIG. 4b. $m_2(t)$ is a band-limited signal whose main lobe bandwidth is 1/T.

Figure 5:
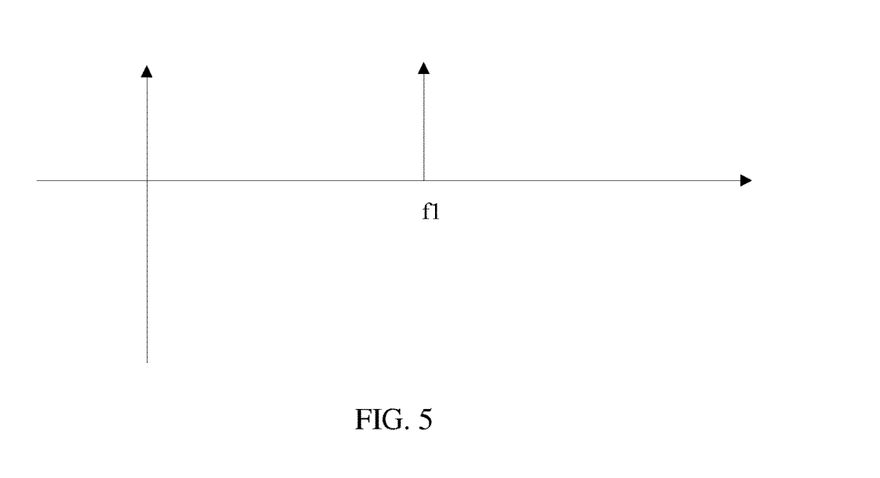
FIG. 5 is a schematic diagram of a signal m3 (*t*) in the prior art.

$m_3(t)$ is an optical carrier. Because the optical carrier is a single carrier with a frequency of $f_1$, the optical carrier may be expressed as a pulse signal in a frequency domain (as shown in FIG. 5).

A signal is sent by overlaying the transmit signal on an optical carrier signal in a transmission process, and therefore a transmitted time domain optical signal is expressed as $E_s(t) = [m_1(t) * m_2(t)] \cdot m_3(t)$, and the signal may be expressed as $E_s(f) = [m_1(f) \cdot m_2(f)] * m_3(f)$ in the frequency domain.

Figure 6:
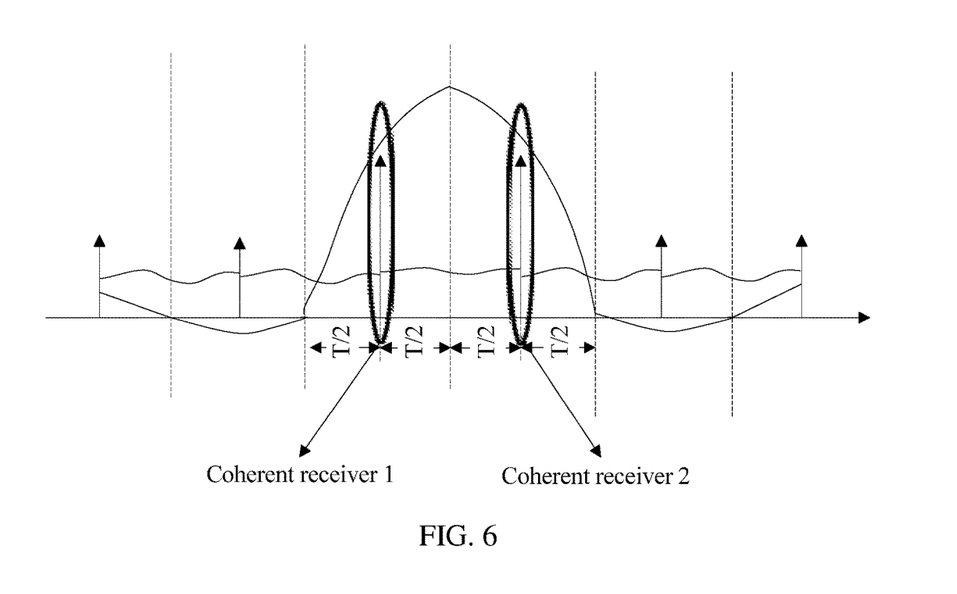
FIG. 6 is a schematic diagram of m1 (*f*) and m2 (*f*) loaded onto a lightwave.

$m_1(f)$ is a cyclic signal with a cycle of 1/T, and $m_2(f)$ is a symmetric band-limited signal at the main lobe bandwidth 1/T. $m_1(f)$ and $m_2(f)$ are multiplied, and then a product is loaded onto a lightwave center frequency $f_1$ (as shown in FIG. 6). With a limited bandwidth ($f_1 - 1/T$ to $f_1 + 1/T$), it can be learned from FIG. 6 that identical signals with a same cycle can be obtained only at $f_1 - \frac{1}{2}T$ and $f_1 + \frac{1}{2}T$.

The two narrowband signals at $f_1 - \frac{1}{2}T$ and $f_1 + \frac{1}{2}T$ and are at a distance of 1/T from each other. This meets a smallest cycle 1/T of $m_1(f)$. In addition, the two narrowband signals are axisymmetric about a center wavelength within a bandwidth of a pulse waveform of $m_2(f)$. Therefore, if no chromatic dispersion is added, the two narrowband signals at $f_1 - \frac{1}{2}T$ and $f_1 + \frac{1}{2}T$ respectively obtained by two coherent receivers should be identical. Therefore, chromatic dispersion in the signal transmission process can be detected by using a difference obtained by comparing the two narrowband signals at $f_1 - \frac{1}{2}T$ and $f_1 + \frac{1}{2}T$.

A principle of chromatic dispersion measurement is as follows: After chromatic dispersion is added, a time delay is generated, under impact of the chromatic dispersion, between the received two narrowband signals at $f_1 - \frac{1}{2}T$ and $f_1 + \frac{1}{2}T$ that should be identical. The two signals are staggered in a time domain.

Figure 7:
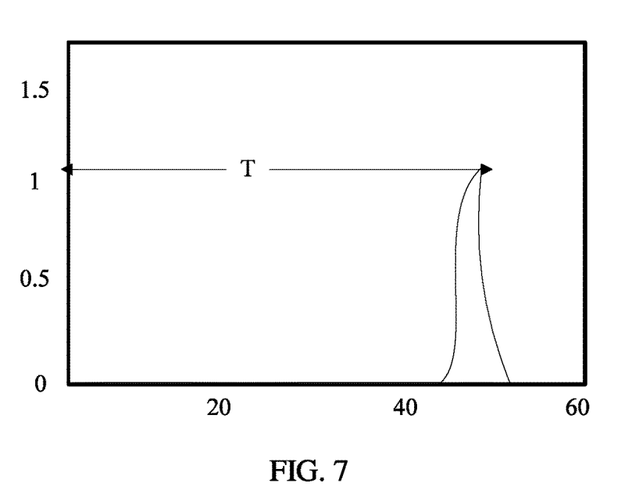
FIG. 7 is a function image that two signals between which a time delay occurs perform cross-correlation.

Cross-correlation is performed on the two signals between which the time delay occurs. A function image of the two signals is shown in FIG. 7, and a peak exists in the function image. A location or a horizontal coordinate of the peak represents a quantity of sampling points between the two staggered signals. Cross-correlation is performed on the collected time domain power signals at ½ of an upper side band and ½ of a lower sideband (that is, $f_1 - \frac{1}{2}T$ and $f_1 + \frac{1}{2}T$), that is, two pieces of time domain data, so that a correlation function is obtained. A horizontal coordinate of a peak of the correlation function is a delay generated after the chromatic dispersion is added to the two pieces of time domain data (the time domain power signals at ½ of the upper sideband and ½ of the lower sideband) that should be identical, and the time delay is in direct proportion to a value of the added chromatic dispersion. The chromatic dispersion in the signal transmission process can be obtained by calculation according to the foregoing principle.

Embodiment

Figure 8:
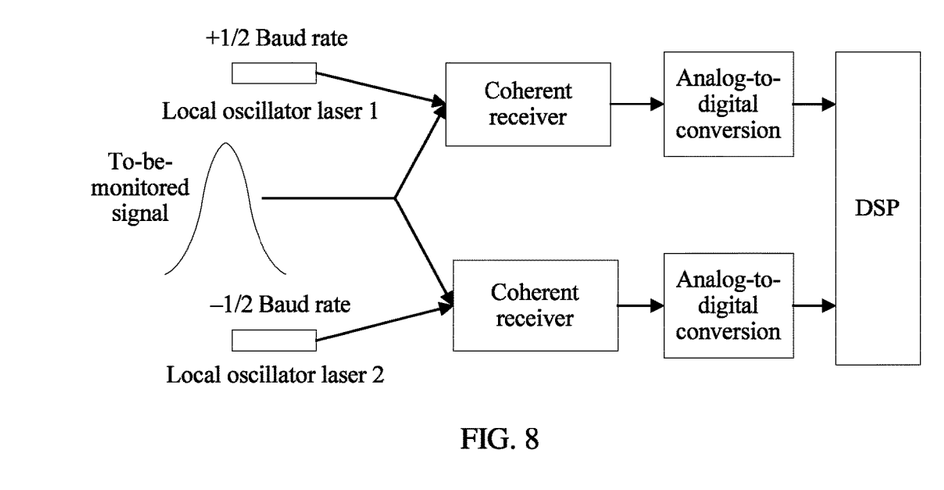
FIG. 8 is a schematic diagram of signal processing in a method for monitoring chromatic dispersion in an optical communications network according to an embodiment of the present disclosure.
Figure 9:
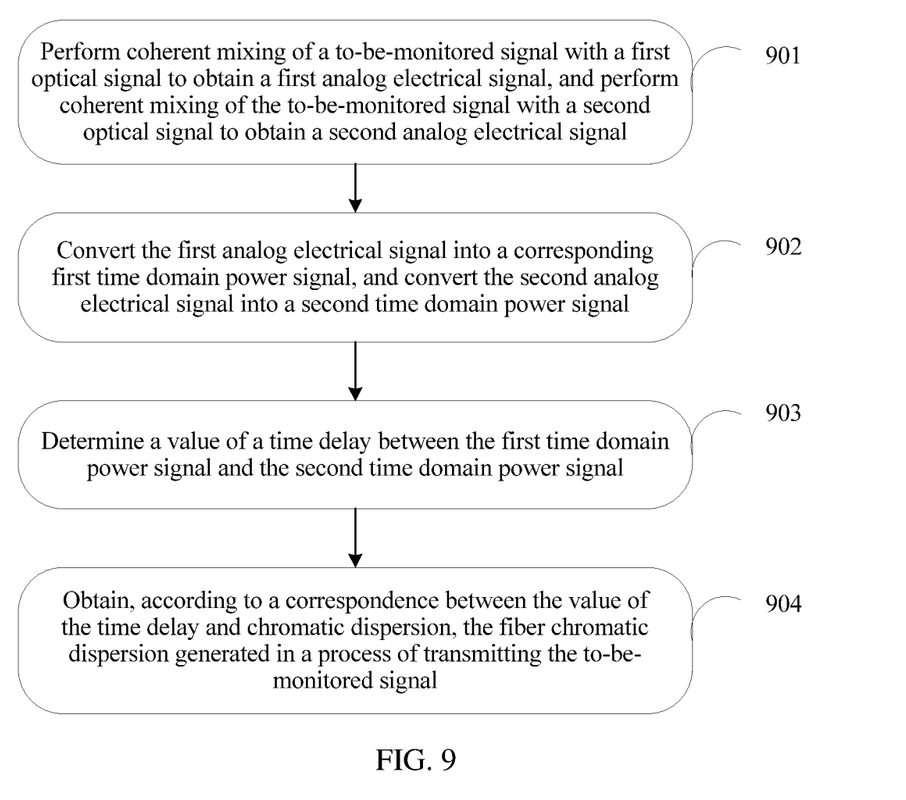
FIG. 9 is a schematic flowchart of a method for monitoring chromatic dispersion in an optical communications network according to an embodiment of the present disclosure.

Based on the foregoing implementation principle, this embodiment of the present disclosure provides a method for monitoring chromatic dispersion in an optical communications network (a method procedure is shown in FIG. 9, and a schematic diagram of specific signal flow processing is shown in FIG. 8). The method specifically includes the following steps.

Step 901. Perform coherent mixing of a to-be-monitored signal with a first optical signal to obtain a first analog electrical signal, and perform coherent mixing of the to-be-monitored signal with a second optical signal to obtain a second analog electrical signal, where center frequencies of the first optical signal and the second optical signal are located on two sides of a center frequency of the to-be-monitored signal, and a difference between the center frequencies of the first optical signal and the second optical signal equals a Baud rate.

In this embodiment, fiber chromatic dispersion can be measured if the first optical signal and the second optical signal are respectively near a location obtained by adding a ½ Baud rate to the center frequency of the to-be-monitored signal and a location obtained by reducing a ½ Baud rate from the center frequency of the to-be-monitored signal. An optimal embodiment of the first optical signal and the second optical signal is: The center frequency of the first optical signal is the center frequency of the to-be-monitored signal plus a ½ Baud rate, and the center frequency of the second optical signal is the center frequency of the to-be-monitored signal minus a ½ Baud rate.

Step 902. Convert the first analog electrical signal into a corresponding first time domain power signal, and convert the second analog electrical signal into a second time domain power signal.

In this embodiment, a specific implementation of the conversion may be:

performing analog-to-digital conversion processing on the first analog electrical signal to obtain a first digital signal, and performing analog-to-digital conversion processing on the second analog electrical signal to obtain a second digital signal; and performing modular squaring on a value of each moment of the first digital signal to obtain the first time domain power signal, and performing modular squaring on a value of each moment of the second digital signal to obtain the second time domain power signal.

Step 903. Determine a value of a time delay between the first time domain power signal and the second time domain power signal.

Figure 10:
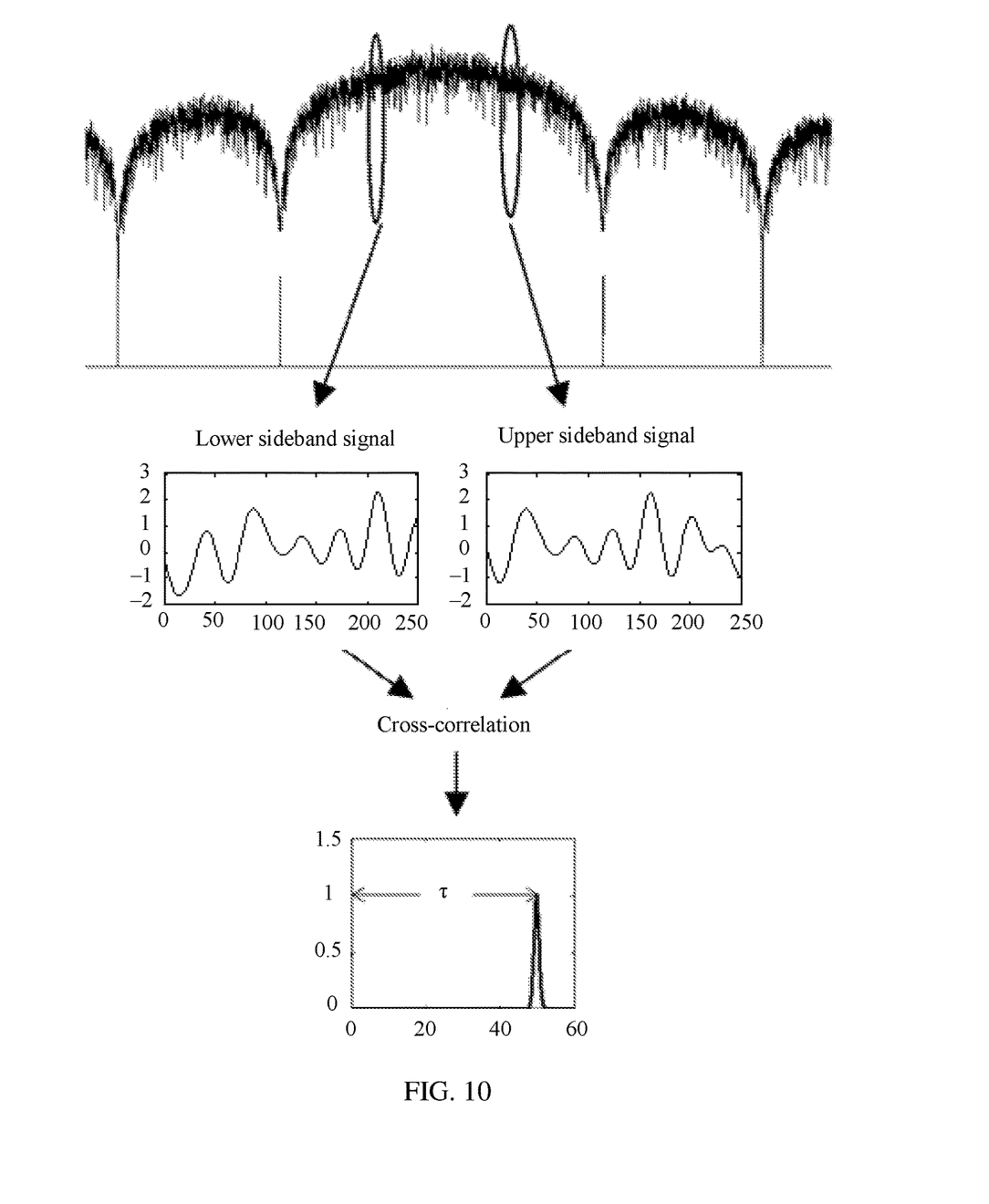
FIG. 10 is a schematic diagram of signal processing that a value of a time delay between two time domain power signals is determined by performing cross-correlation on the two signals according to an embodiment of the present disclosure.

In this embodiment, after the analog electrical signals are converted into the time domain power signals, the value of time delay between the two time domain power signals may be determined in various manners. In this embodiment, an optimal manner is determining the value of the time delay between the two time domain power signals by performing cross-correlation on the two signals (a specific implementation principle is shown in FIG. 10).

In the manner in which the value of the time delay is determined by performing cross-correlation on the two time domain power signals, there is a peak in a correlation function of the two time domain power signals. A peak location $\tau_0$ represents a value of a time delay between two power signals respectively at a location obtained by adding a ½ Baud rate to the center frequency and a location obtained by reducing a ½ Baud rate from the center frequency (as shown in FIG. 7). The value of the time delay is in direct proportion to a value of the chromatic dispersion. The value of the time delay is a delay generated due to staggering of the two analog electrical signals respectively at the location obtained by adding a ½ Baud rate to the center frequency and the location obtained by reducing a ½ Baud rate from the center frequency. Before the chromatic dispersion is added, the two analog electrical signals should be identical signals that have a same cycle. After the chromatic dispersion is added, the two signals are affected by the chromatic dispersion due to a difference in carriers, and therefore the time delay is generated. The added chromatic dispersion is in direct proportion to the value of the time delay, and therefore the chromatic dispersion can be calculated according to the value of the time delay.

Step 904. Obtain, according to a correspondence between the value of the time delay and chromatic dispersion, the fiber chromatic dispersion generated in a process of transmitting the to-be-monitored signal.

The following further describes in detail a signal processing procedure in the method provided in this embodiment of the present disclosure with reference to FIG. 8. A specific implementation may be as follows:

The to-be-monitored signal is input into the two coherent receivers. The two coherent receivers perform coherent mixing of the to-be-monitored signal separately with local oscillator laser 1 and local oscillator laser 2 to obtain the two analog electrical signals. Signal processing procedures of the two coherent receivers are identical. The signal processing procedure of the coherent receiver corresponding to the local oscillator laser 1 is used as an example for description below.

The to-be-monitored signal and the local oscillator laser 1 are input into the coherent receiver at the same time. The coherent receiver performs coherent mixing of the to-be-monitored signal with the local oscillator laser 1, and then obtains four optical signals. Subsequently, the four optical signals are divided into two groups of optical signals. Photoelectric detection is performed on each group of optical signals, and then one analog electrical signal is obtained. Two analog electrical signals are correspondingly obtained from the two groups of optical signals (each analog electrical signal represents partial information of a finally output analog electrical signal). The two analog electrical signals are combined to form the analog electrical signal finally output by the coherent receiver (that is, the first analog electrical signal in this embodiment).

Further, an analog-to-digital conversion module is used to convert the analog electrical signal into a discrete digital electrical signal a (the digital signal a is a signal corresponding to a location at an f−½T frequency of the to-be-monitored signal).

Based on the same processing procedure for the local oscillator laser 1 and the to-be-monitored signal, a digital electrical signal b (the digital signal b is a signal corresponding to a location at a f+½T frequency of the to-be-monitored signal) may also be obtained after the same processing procedure for the local oscillator laser 2 and the to-be-monitored signal.

A signal processor (for example, a DSP) performs modular squaring on a value of each moment of the digital electrical signal a to obtain the first time domain power signal, and performs modular squaring on a value of each moment of the digital electrical signal b to obtain the second time domain power signal (the time domain power signal represents power of the digital electrical signal at each moment).

Then, after a cross-correlation operation is performed on the first time domain power signal and the second time domain power signal, the value of the time delay between the two time domain power signals is obtained. In this way, a value of a time delay in fiber optic transmission can be determined according to a relationship between the chromatic dispersion and the value of the time delay.

Specifically, the fiber chromatic dispersion may be determined by using the following formula:

$$CD = \frac{\tau_0 Tc}{\lambda^2}$$

$\tau_0$ is the value of the time delay between the two time domain power signals, T is an element width of an equivalent baseband signal of the to-be-monitored signal, $\lambda$ is the center frequency of the to-be-monitored signal, and c is the speed of light.

In addition, an existing optical communications system generally uses a polarization multiplexing technology, and the polarization multiplexing technology modulates information to two orthogonal polarization states (that is, X-polarization and Y-polarization). To monitor chromatic dispersion of a polarization multiplexing system, a polarization beam splitter (Polarization Beam Splitter, PBS) may be used to split the to-be-monitored signal and the local oscillator laser into the two orthogonal polarization states to separately perform chromatic dispersion estimation. Therefore, in a technical solution provided in this embodiment, when the to-be-monitored optical signal includes an X-polarization signal and a Y-polarization signal, where the X-polarization signal and the Y-polarization signal are orthogonal, the X-polarization signal and the Y-polarization signal are separately used as an independent signal, to perform a mixing operation with the first optical signal and the second optical signal to obtain four analog electrical signals. To determine the value of the time delay, the four analog electrical signals need to be combined to form 2 analog electrical signals. A specific implementation may be as follows:

The four analog electrical signals are: Ux, Lx, Uy, and Ly. Specifically:

Coherent mixing of the X-polarization signal with the first optical signal and the second optical signal is separately performed to obtain signals in an X-polarization direction. The signals include the X-polarization analog electrical signal Ux corresponding to the first optical signal and the X-polarization analog electrical signal Lx corresponding to the second optical signal.

Coherent mixing of the Y-polarization signal with the first optical signal and the second optical signal is separately performed to obtain signals in a Y-polarization direction. The signals include the Y-polarization analog electrical signal Uy corresponding to the first optical signal and the Y-polarization analog electrical signal Ly corresponding to the second optical signal.

The corresponding first analog electrical signal and the second analog electrical signal separately include two parts. Specifically:

The first analog electrical signal includes Ux and Uy, and the second analog electrical signal includes Lx and Ly.

Further, determining the time domain power signal may be: performing modular squaring on Ux and Uy (that is, $|Ux|^2+|Uy|^2$) to obtain the first time domain power signal, and separately performing modular squaring on Lx and Ly (that is, $|Lx|^2+|Ly|^2$) to obtain the second time domain power signal.

In this embodiment, impact of polarization mode dispersion can be eliminated by calculating the value of the time delay by performing cross-correlation on the two polarization power signals. If polarization mode dispersion also exists in a chromatic dispersion system, a polarization mode dispersion parameter does not affect values of $|Ux|^2+|Uy|^2$ and $|Lx|^2+|Ly|^2$. Therefore, a relatively accurate value of the time delay can be obtained by performing power cross-correlation on $|Ux|^2+|Uy|^2$ and $|Lx|^2+|Ly|^2$.

Figure 11:
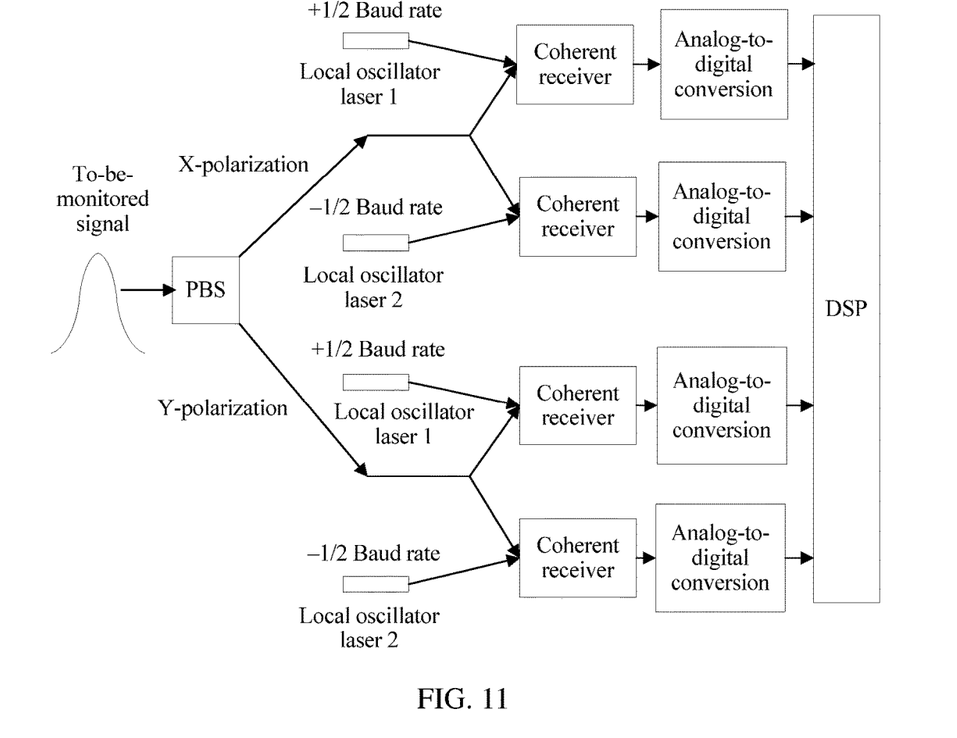
FIG. 11 is schematic diagram of signal processing that two polarization signals of a to-be-monitored optical signal are used as two independent signals for processing according to an embodiment of the present disclosure.

In addition, in this embodiment, the two polarization signals corresponding to the to-be-monitored optical signal may be used as two independent signals, and then processing such as coherent mixing of the two independent signals with the first optical signal and the second optical signal is separately performed, so as to obtain two fiber chromatic dispersion values (a signal flow processing is shown in FIG. 11).

The method provided in this embodiment of the present disclosure is independent of a modulation pattern, and is related to a Baud rate. Therefore an algorithm is simple and is easy to implement.

In addition, the method provided in this embodiment of the present disclosure can precisely and effectively implement CD monitoring on an optical network, and can provide a reliable information resource for management of the optical network, thereby making monitoring, management, and operation of the optical network more convenient.

Another Embodiment

Figure 12:
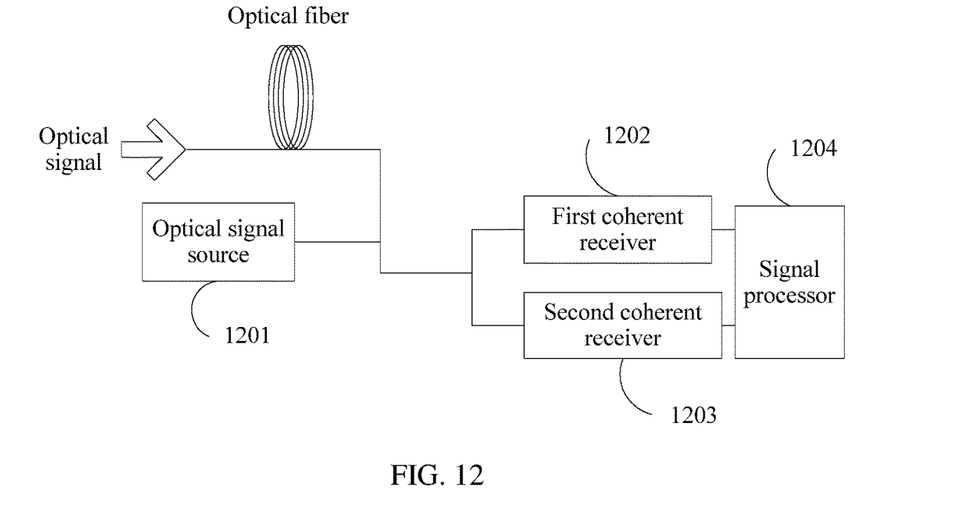
FIG. 12 is a schematic structural diagram of an apparatus for monitoring chromatic dispersion in an optical communications network according to an embodiment of the present disclosure.

As shown in FIG. 12, this embodiment provides an apparatus for monitoring chromatic dispersion in an optical communications network. The apparatus includes: an optical signal source 1201, a first coherent receiver 1202, a second coherent receiver 1203, and a signal processor 1204.

The optical signal source 1201 is configured to generate a first optical signal and a second optical signal, where center frequencies of the first optical signal and the second optical signal are located on two sides of a center frequency of a to-be-monitored signal, and a difference between the center frequencies of the first optical signal and the second optical signal equals a Baud rate.

The first coherent receiver 1202 is connected to the optical signal source, and configured to perform coherent mixing of the to-be-monitored signal with the first optical signal to obtain a first analog electrical signal.

The second coherent receiver 1203 is connected to the optical signal source, and configured to perform coherent mixing of the to-be-monitored signal with the second optical signal to obtain a second analog electrical signal.

In a specific implementation environment, each coherent receiver includes at least one frequency mixer and one photodetector. The two coherent receivers respectively process the two signals, and each coherent receiver corresponds to one signal.

The signal processor 1204 is connected to the first coherent receiver and the second coherent receiver, and configured to convert the first analog electrical signal into a corresponding first time domain power signal, convert the second analog electrical signal into a second time domain power signal, determine a value of a time delay between the first time domain power signal and the second time domain power signal, and obtain, according to a correspondence between the value of the time delay and the chromatic dispersion, the fiber chromatic dispersion generated in a process of transmitting the to-be-monitored signal.

In a specific use environment, the optical signal source 1201 includes various implementations. The following provides two optimal implementations.

Implementation 1:

The optical signal source includes two lasers, and the two lasers are respectively configured to generate the first optical signal and the second optical signal. Specifically:

The first laser is configured to generate the first optical signal.

The second laser is configured to generate the second optical signal.

Figure 13:
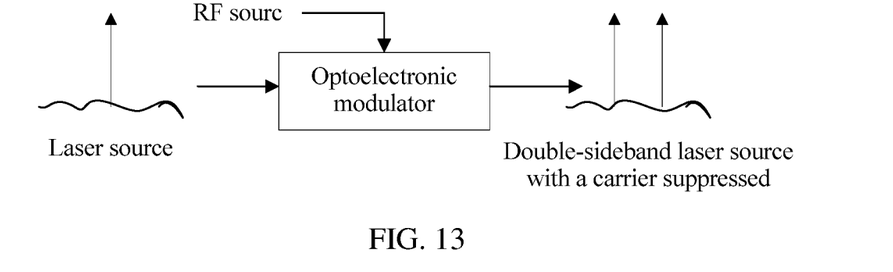
FIG. 13 is a schematic structural diagram of an optical signal source according to an embodiment of the present disclosure.

Implementation 2:

The optical signal source includes a laser source, an optoelectronic modulator, and a microwave signal source (a specific structure is shown in FIG. 13). Specifically:

The laser source is configured to generate an optical signal.

Two input ends of the optoelectronic modulator are respectively connected to output ends of the laser source and the microwave signal source, and the optoelectronic modulator is configured to perform, by using a signal generated by the microwave signal source, carrier suppression modulation on the optical signal to generate the first optical signal and the second optical signal.

In this embodiment, an optimal implementation may be: The center frequency of the first optical signal is the center frequency of the to-be-monitored signal plus a ½ Baud rate; and the center frequency of the second optical signal is the center frequency of the to-be-monitored signal minus a ½ Baud rate.

Another Embodiment

Figure 14:
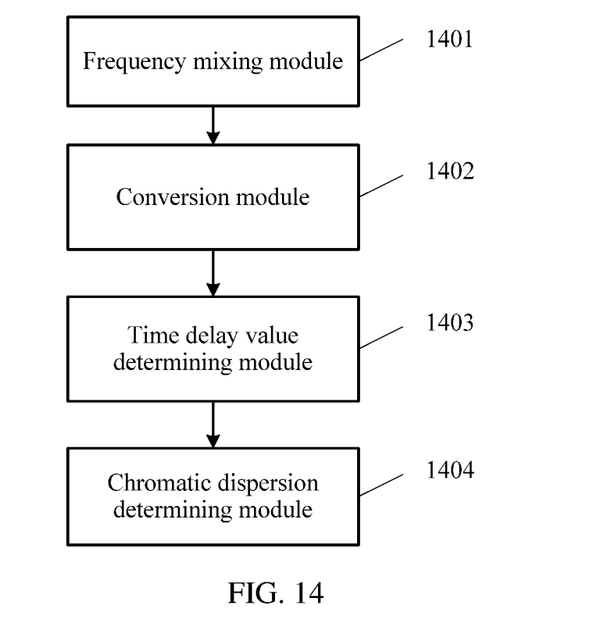
FIG. 14 is a schematic structural diagram of another apparatus for monitoring chromatic dispersion in an optical communications network according to an embodiment of the present disclosure.

As shown in FIG. 14, this embodiment further provides another apparatus for monitoring chromatic dispersion in an optical communications network. The apparatus includes: a mixing module 1401, a conversion module 1402, a time delay value determining module 1403, and a chromatic dispersion determining module 1404.

The mixing module 1401 is configured to perform coherent mixing of a to-be-monitored signal with a first optical signal to obtain a first analog electrical signal, and perform coherent mixing of the to-be-monitored signal with a second optical signal to obtain a second analog electrical signal, where center frequencies of the first optical signal and the second optical signal are located on two sides of a center frequency of the to-be-monitored signal, and a difference between the center frequencies of the first optical signal and the second optical signal equals a Baud rate.

The conversion module 1402 is configured to convert the first analog electrical signal into a corresponding first time domain power signal, and convert the second analog electrical signal into a second time domain power signal.

Optionally, the conversion module 1402 is specifically configured to perform analog-to-digital conversion processing on the first analog electrical signal to obtain a first digital signal; perform analog-to-digital conversion processing on the second analog electrical signal to obtain a second digital signal; perform modular squaring on a value of each moment of the first digital signal to obtain the first time domain power signal; and perform modular squaring on a value of each moment of the second digital signal to obtain the second time domain power signal.

The time delay value determining module 1403 is configured to determine a value of a time delay between the first time domain power signal and the second time domain power signal.

The chromatic dispersion determining module 1404 is configured to obtain, according to a correspondence between the value of the time delay and the chromatic dispersion, the fiber chromatic dispersion generated in a process of transmitting the to-be-monitored signal.

Optionally, the chromatic dispersion determining module is specifically configured to determine, according to the value of the time delay and a formula $$CD = \frac{\tau_0 Tc}{\lambda^{\wedge}2},$$

the fiber chromatic dispersion generated in the process of transmitting the to-be-monitored signal, where $\tau_0$ is the value of the time delay between the two time domain power signals, T is an element width of an equivalent baseband signal of the to-be-monitored signal, $\lambda$ is the center frequency of the to-be-monitored signal, and c is the speed of light.

The foregoing one or more technical solutions in the embodiments of this application have at least the following technical effects:

According to the chromatic dispersion detection method provided in the embodiments of the present disclosure, the two analog electrical signals on the upper and lower sidebands of the to-be-monitored optical signal are obtained by performing coherent mixing of the to-be-monitored signal with a specific optical signal, and then the chromatic dispersion is determined by using the value of the time delay between the two analog electrical signals. Therefore, the technical solutions provided in the embodiments are independent of a modulation pattern, and are related to a Baud rate. Therefore an algorithm is simple and is easy to implement.

In addition, the method provided in this embodiment of the present disclosure can precisely and effectively implement CD monitoring on an optical network, and can provide a reliable information resource for management of the optical network, thereby making monitoring, management, and operation of the optical network more convenient.

The method of the present disclosure is not limited to the embodiments described in the specific implementations. Other implementations obtained by a person skilled in the art according to the technical solutions of the present disclosure also fall within the technical innovation scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for monitoring chromatic dispersion in an optical communications network, the method comprising:
    performing coherent mixing of a to-be-monitored signal with a first optical signal to obtain a first analog electrical signal, wherein a first center frequency of the first optical signal is located on a first side of a center frequency of the to-be-monitored signal;
    performing coherent mixing of the to-be-monitored signal with a second optical signal to obtain a second analog electrical signal, wherein a second center frequency of the second optical signal is located on a second side of the center frequency of the to-be-monitored signal, and a difference between the first center frequency and the second center frequency equals a Baud rate;
    converting the first analog electrical signal into a corresponding first time domain power signal;
    converting the second analog electrical signal into a second time domain power signal;
    determining a value of a time delay between the first time domain power signal and the second time domain power signal; and
    obtaining, according to a correspondence between the value of the time delay and chromatic dispersion, a fiber chromatic dispersion generated in a process of transmitting the to-be-monitored signal.

2. The method according to claim 1, wherein obtaining, according to a correspondence between the value of the time delay and chromatic dispersion, the fiber chromatic dispersion generated in a process of transmitting the to-be-monitored signal comprises:
    determining, according to the value of the time delay and a formula $$CD = \frac{\tau_0 Tc}{\lambda^{\wedge}2},$$

the fiber chromatic dispersion generated in the process of transmitting the to-be-monitored signal, wherein $\tau_0$ is the value of the time delay between the two time domain power signals, T is an element width of an equivalent baseband signal of the to-be-monitored signal, $\lambda$ is the center frequency of the to-be-monitored signal, and c is the speed of light.

3. The method according to claim 1, wherein converting the first analog electrical signal into a corresponding first time domain power signal, and converting the second analog electrical signal into a second time domain power signal comprises:
    performing analog-to-digital conversion processing on the first analog electrical signal to obtain a first digital signal;
    performing analog-to-digital conversion processing on the second analog electrical signal to obtain a second digital signal;
    performing modular squaring on a value of each moment of the first digital signal to obtain the first time domain power signal; and
    performing modular squaring on a value of each moment of the second digital signal to obtain the second time domain power signal.

4. The method according to claim 3, wherein when an optical signal is a signal that comprises an X-polarization signal and a Y-polarization signal which are orthogonal, the method comprises:
    using the X-polarization signal and the Y-polarization signal separately as the to-be-monitored signal and performing coherent mixing of the to-be-monitored signal separately with the first optical signal and the second optical signal, to obtain an X-polarization analog electrical signal Ux corresponding to the first optical signal, a Y-polarization analog electrical signal Uy corresponding to the first optical signal, an X-polarization analog electrical signal Lx corresponding to the second optical signal, and a Y-polarization analog electrical signal Ly corresponding to the second optical signal, wherein Ux and Lx are signals obtained by performing coherent mixing of the X-polarization signal separately with the first optical signal and the second optical signal, and Uy and Ly are signals obtained by performing coherent mixing of the Y-polarization signal separately with the first optical signal and the second optical signal; and wherein the first analog electrical signal comprises Ux and Uy, and the second analog electrical signal comprises Lx and Ly.

5. An apparatus for monitoring chromatic dispersion in an optical communications network, the apparatus comprising:
an optical signal source, configured to:
generate a first optical signal having a first center frequency located on a first side of a center frequency of a to-be-monitored signal,
generate a second optical signal having a second center frequency located on a second side of the center frequency of the to-be-monitored signal, and
wherein a difference between the center frequencies of the first optical signal and the second optical signal equals a Baud rate;
a first coherent receiver connected to the optical signal source and configured to perform coherent mixing of the to-be-monitored signal with the first optical signal to obtain a first analog electrical signal;
a second coherent receiver connected to the optical signal source and configured to perform coherent mixing of the to-be-monitored signal with the second optical signal to obtain a second analog electrical signal; and
a signal processor connected to the first coherent receiver and the second coherent receiver, and configured to:
convert the first analog electrical signal into a corresponding first time domain power signal,
convert the second analog electrical signal into a second time domain power signal,
determine a value of a time delay between the first time domain power signal and the second time domain power signal, and
obtain, according to a correspondence between the value of the time delay and chromatic dispersion, a fiber chromatic dispersion generated in a process of transmitting the to-be-monitored signal.

6. The apparatus according to claim 5, wherein the optical signal source comprises:
a first laser, configured to generate the first optical signal; and
a second laser, configured to generate the second optical signal.

7. The apparatus according to claim 5, wherein the optical signal source comprises:
a laser source, configured to generate an optical signal; and
an optoelectronic modulator having two input ends respectively connected to an output end of the laser source and an output end of a microwave signal source, and configured to perform, by using a signal generated by the microwave signal source, carrier suppression modulation on the optical signal to generate the first optical signal and the second optical signal.

8. An apparatus for monitoring chromatic dispersion in an optical communications network, the apparatus comprising:
a coherent receiver, configured to perform coherent mixing of a to-be-monitored signal with a first optical signal to obtain a first analog electrical signal, and perform coherent mixing of the to-be-monitored signal with a second optical signal to obtain a second analog electrical signal, wherein a first center frequency of the first optical signal is located on a first side of a center frequency of the to-be-monitored signal and a second center frequency of the second optical signal is located on a second side of the center frequency of the to-be-monitored signal, and a difference between the first center frequency and the second center frequency equals a Baud rate;
a conversion module, configured to convert the first analog electrical signal into a corresponding first time domain power signal, and convert the second analog electrical signal into a second time domain power signal;
a time delay value determining module, configured to determine a value of a time delay between the first time domain power signal and the second time domain power signal; and
a chromatic dispersion determining module, configured to obtain, according to a correspondence between the value of the time delay and chromatic dispersion, a fiber chromatic dispersion generated in a process of transmitting the to-be-monitored signal.

9. The apparatus according to claim 8, wherein the chromatic dispersion determining module is configured to determine, according to the value of the time delay and a formula $$CD = \frac{\tau_0 Tc}{\lambda^2},$$

the fiber chromatic dispersion generated in the process of transmitting the to-be-monitored signal, wherein $\tau_0$ is the value of the time delay between the two time domain power signals, T is an element width of an equivalent baseband signal of the to-be-monitored signal, $\lambda$ is the center frequency of the to-be-monitored signal, and c is the speed of light.

10. The apparatus according to claim 8, wherein the conversion determining module is configured to:
perform analog-to-digital conversion processing on the first analog electrical signal to obtain a first digital signal;
perform analog-to-digital conversion processing on the second analog electrical signal to obtain a second digital signal;
perform modular squaring on a value of each moment of the first digital signal to obtain the first time domain power signal; and
perform modular squaring on a value of each moment of the second digital signal to obtain the second time domain power signal.

* * * * *